(12) United States Patent
Säfström et al.

(10) Patent No.: US 6,464,826 B1
(45) Date of Patent: Oct. 15, 2002

(54) METHOD FOR PRODUCING AND TREATING WOOD FIBER

(75) Inventors: Christer Säfström, Stockholm; Carl-Johan Söderberg, Sundsvall; Göran Lundgren, Alnö, all of (SE)

(73) Assignee: Valmet Fibertech AB (SE)

( * ) Notice: Subject to any disclaimer, the term of this patent is extended or adjusted under 35 U.S.C. 154(b) by 0 days.

(21) Appl. No.: 09/485,942

(22) PCT Filed: Aug. 10, 1998

(86) PCT No.: PCT/SE98/01451

§ 371 (c)(1),
(2), (4) Date: Feb. 18, 2000

(87) PCT Pub. No.: WO99/10594

PCT Pub. Date: Mar. 4, 1999

(30) Foreign Application Priority Data

Aug. 25, 1997 (SE) ............................................... 9703062
Dec. 15, 1997 (SE) ............................................... 9704674

(51) Int. Cl.[7] .............................................. D21B 1/12
(52) U.S. Cl. ............................ 162/23; 162/9; 162/17; 162/21; 162/28; 162/46; 162/47; 162/234; 162/239; 162/243; 241/28
(58) Field of Search ...................... 162/23, 234, 239, 162/243, 244, 249, 261, 9, 17, 21, 28, 46, 47; 241/28

(56) References Cited

U.S. PATENT DOCUMENTS

| | | | |
|---|---|---|---|
| 4,235,665 A | 11/1980 | Reinhall et al. | 162/23 |
| 4,710,268 A | 12/1987 | Nilsson | 162/23 |

*Primary Examiner*—Steven P. Griffin
*Assistant Examiner*—Mark Halpern
(74) *Attorney, Agent, or Firm*—Lerner, David, Littenberg, Krumholz & Mentlik, LLP

(57) ABSTRACT

Method is disclosed for treating wood chips including a heater for preheating the wood chips in the presence of steam, a beater to mechanically process the wood chips into wood fibers, a cyclone for separating the wood fibers from steam and volatile organic substances produced in the beater, a blower line for transporting the wood fibers, steam and volatile organic substances from the beater to the inlet of the cyclone, a drying conduit connected to the lower outlet of the cyclone for carrying wood fibers therefrom, a sluice valve associated with the lower outlet of the cyclone for controlling the removal of the wood fibers from the cyclone, and a processing conduit connected to the upper outlet of the cyclone for the steam and the volatile organic substances whereby the volatile organic substances separated in the cyclone can be separated and heat associated with the steam separated in the cyclone can be recovered.

6 Claims, 4 Drawing Sheets

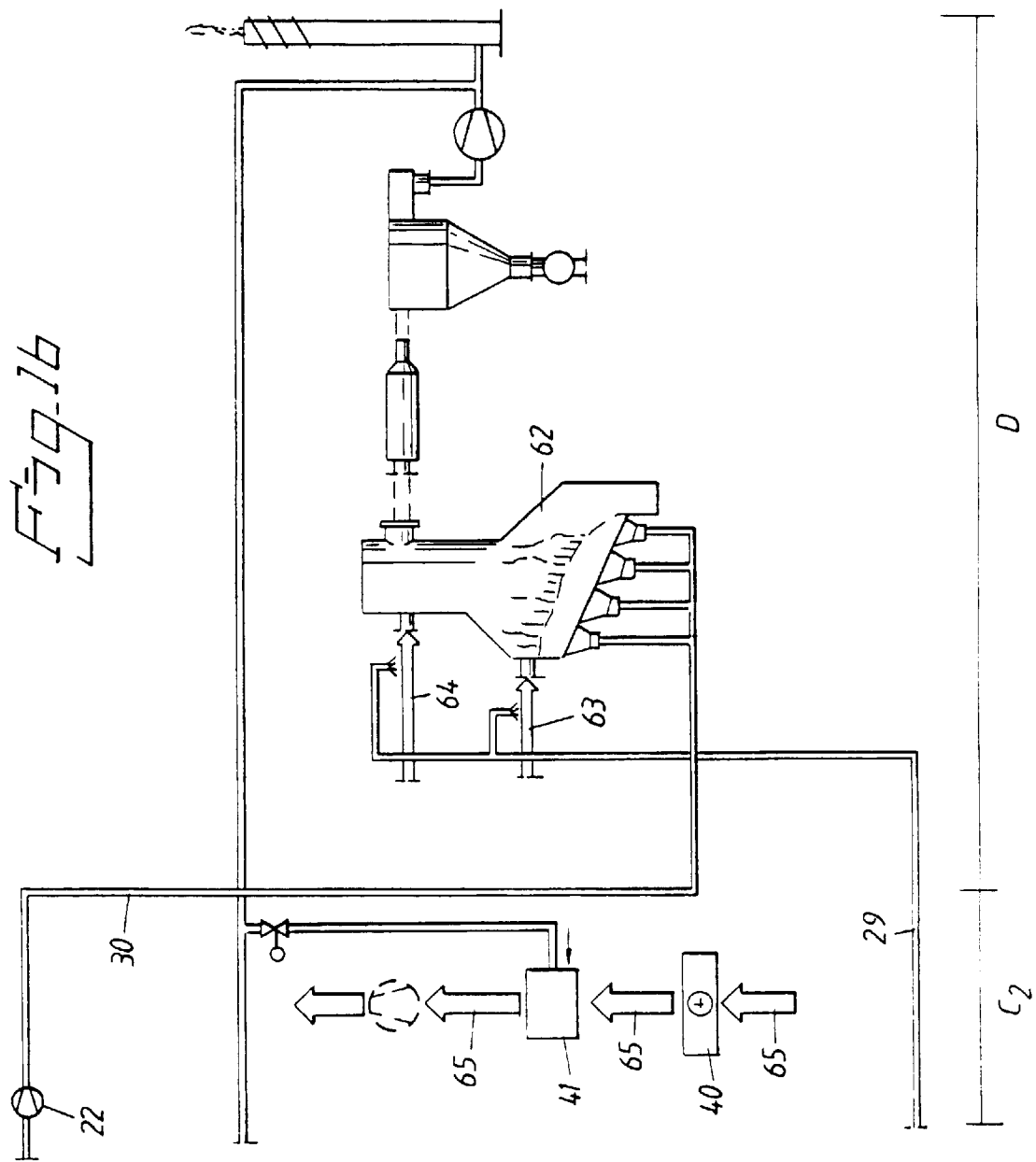

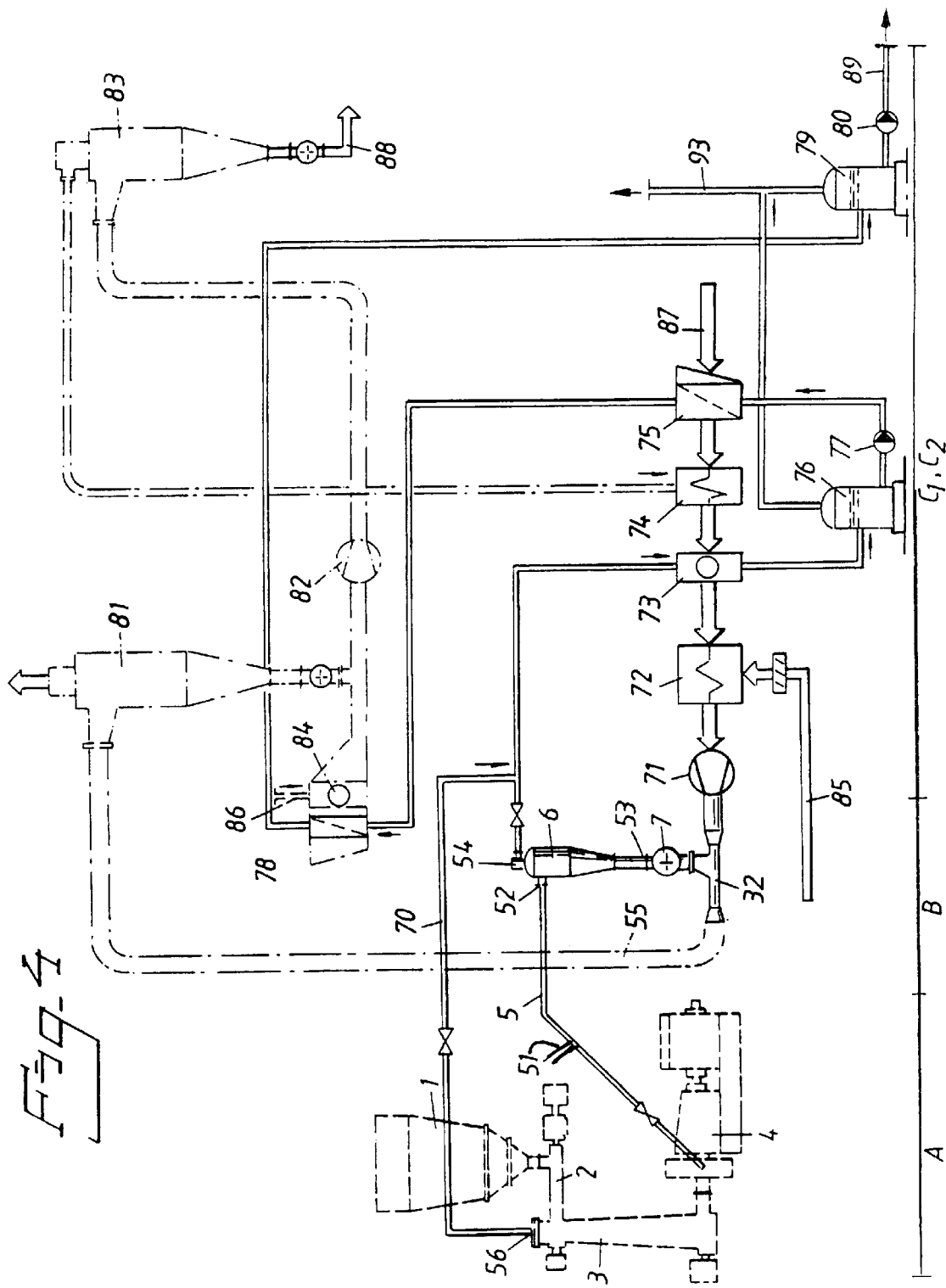

US 6,464,826 B1

METHOD FOR PRODUCING AND TREATING WOOD FIBER

FIELD OF THE INVENTION

The present invention relates to a method designed to produce and treat wood fibers.

BACKGROUND OF THE INVENTION

One problem which is generally encountered in connection with plants for producing and treating wood fibers is the emission to the surrounding atmosphere of volatile organic substances, i.e. Volatile Organic Compounds (VOC), as well as formaldehyde from the raw wood, and from the size which is used in the process. One object of the present invention is to solve this problem. Another object of the present invention is to recover thermal energy in these processes.

SUMMARY OF THE INVENTION

These and other objects have now been accomplished by the invention of apparatus for the treatment of wood chips comprising a preheater for preheating the wood chips in the presence of steam thereby producing volatile organic substances from the wood chips therein, a beater for mechanically processing the wood chips whereby wood fibers are released from the wood chips and the steam and the volatile organic substances are contained therein, a cyclone for separating the wood fibers from the steam and the volatile organic substances, the cyclone including an inlet, an upper outlet and a lower outlet, a blower line for transporting the wood fibers, the steam and the volatile organic substances from the beater to the inlet of the cyclone, a drying conduit connected to the lower outlet of the cyclone for carrying the wood fibers therefrom, a sluice valve associated with the lower outlet of the cyclone for controlling the removal of the wood fibers from the cyclone, and a processing conduit connected to the upper outlet of the cyclone for the steam and the volatile organic substances whereby the volatile organic substances separated in the cyclone can be separated and heat associated with the steam separated in the cyclone can be recovered. In a preferred embodiment, the apparatus includes a scrubber for separating the volatile organic substances from the steam separated in the cyclone, and a heating coil for recovering heat from the steam separated in the scrubber.

In accordance with a preferred embodiment of the apparatus of the present invention, the apparatus includes a steam ejector associated with the lower outlet of the cyclone for transporting the wood fibers in the dryer conduit, and a mixing chamber attached to the steam ejector for mixing flue gas and drying air and supplying the mixture of flue gas and drying air to the steam ejector.

In accordance with one embodiment of the apparatus of the present invention, the apparatus includes an injector associated with the lower outlet of the cyclone, and an air compressor for supplying compressed air to the injector for transporting the wood fiber, the steam and the volatile organic substances in the drying conduit.

In accordance with another embodiment of the apparatus of the present invention, the preheater includes an upper portion including a wood chip entrance and an outlet, a lower portion, and a steam inlet for supplying steam to the lower portion of the preheater whereby the steam can countercurrently contact the wood chips entering the wood chip entrance in the preheater and the volatile organic substances and steam can exit from the outlet from the preheater, and a scrubber connected to the outlet from the preheater whereby the volatile organic substances can be separated from the steam and additional heat can be recovered from the steam.

In accordance with another embodiment of the apparatus of the present invention, the apparatus includes a heat exchanger connected to the outlet from the cyclone and a condensate tank connected to the heat exchanger whereby the volatile organic substances can be separated in the gaseous state for incineration and the heat can be recovered from the steam. Preferably, the heat exchanger comprises a first heat exchanger, and the apparatus includes a second heat exchanger and a third heat exchanger connected to the condensate tank for providing heat for drying the wood fibers and for cooling the condensate in the condensate tank. Preferably, the apparatus includes at least one mixing chamber whereby the drying conduit supplies drying air to at least one of the second and third heat exchangers.

BRIEF DESCRIPTION OF THE DRAWINGS

The present invention will be more fully appreciated with reference to the following detailed description, which, in turn, refers to the attached drawings in which:

FIG. 1b is a schematic representation of another portion of the process performed in a plant designed in accordance with the present invention;

FIG. 4 is a schematic representation of the process performed in an alternative embodiment of a plant designed in accordance with the present invention.

DETAILED DESCRIPTION

Figure 1A:
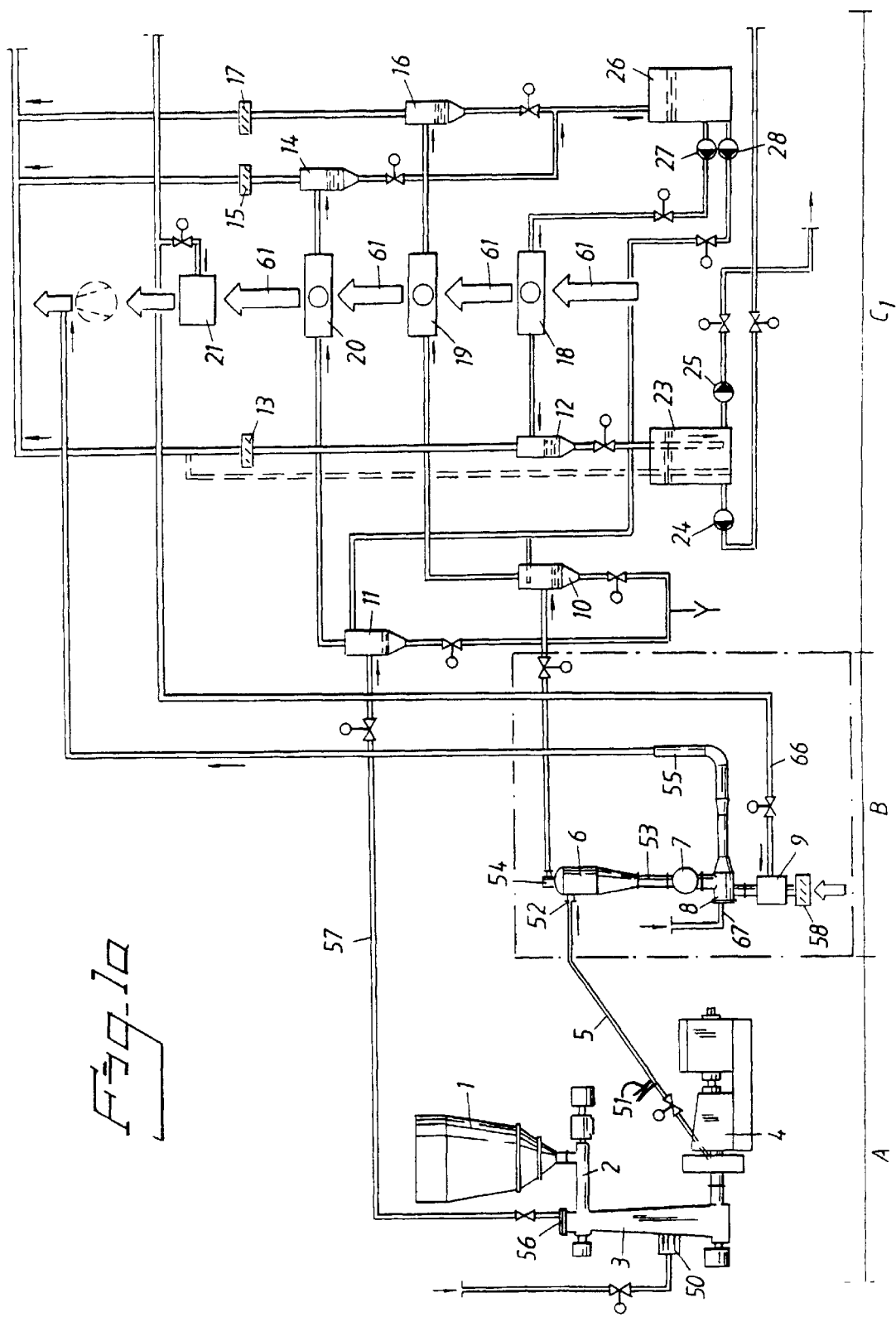
FIG. 1a is schematic representation of the process performed in a portion of a plant designed in accordance with the present invention.

The plant shown in FIGS. 1a and 1b comprises a number of parts, including a fiber production part A, a steam separator part B, two fiber drying stages, $C_1$ and $C_2$, and an energy subplant D. The plant will be described with regard to its design/construction while simultaneously explaining its operation in order to avoid needless repetition.

In fiber-production part A, the wood chips are preheated in an alkalinizing bin 1, preferably using steam at atmospheric pressure. From bin 1, the chips are fed by a plug-type screw conveyor 2 which compresses and dewaters the chips as they are conveyed to chip preheater 3. Chip preheater 3 heats the chips with heat obtained from condensing steam that is supplied through steam inlet 50 located in the lower part of the preheater, the pressure, temperature and time having been present and adapted to the raw wood chips. Preheater 3 has a top outlet 56 where released organic emissions are degassed from the wood along with air during heating, thereby improving heat transfer between the steam and the chips. The greater part of the emissions, i.e. volatile organic substances (VOC and formaldehyde), is released in the preheater and separated at a high concentration in the top of the preheater and conveyed together with steam and air through line 57 to scrubber 11 where solid particles are separated along with certain condensable organic substances and volatile waste gases, and where heat is recovered from the steam. Since the steam is supplied through inlet 50 at a low level the chips, which enter from the top of the preheater, can be washed in counterflowing steam during condensation.

The electrical energy that is added in order to free fibers from the chips in beater 4 is converted, for the most part, to steam in connection with the mechanical processing of is the preheated chips to produce free fibers or fiber bundles. During processing, a certain amount of organic emissions are released from the wood, and they are conveyed forward in blower line 5 in the gaseous state together with the steam. In blower line 5 the fibers, fiber bundles and steam are conveyed at high speed to inlet 52 of cyclone separator 6. If size is to be used, it is added in blower line 5 at 51 thereby sizing the fiber. Emissions of volatile organic substances are also released from the size, and together with the fiber and the steam, they are conveyed to cyclone separator 6 for separation from the fiber. Bottom outlet 53 on cyclone separator 6 is connected, by means of sluice valve 7, to conveyance line 55 in which the fiber is sent to a fiber drier. However, drying of the fiber can also take place in line 55 due to the fact that the transport medium is drying air (see especially FIGS. 2 and 4). Consequently, line 55 will hereinafter be called conveyance/drying line 55. Upper connection 54 on the cyclone separator is connected to scrubber 10 that separates the fibers and organic substances from the steam obtained from the cyclone separator.

Cyclone separator 6 can be included in several alternative basic embodiments. In alternative embodiment 1, which is shown in FIG. 1a, steam ejector 8 is connected downstream from sluice valve 7. Steam ejector 8, which is supplied with steam at 67, handles further conveyance of the fiber together with preheated drying air and flue gases that are sucked from mixing chamber 9. This mixing chamber 9 receives flue gases through line 66, which runs from energy subplant D in the plant and also receives drying air through valve 58. In this alternative embodiment, the fiber is already being dried while it is being conveyed to drier stage $C_1$.

Figure 2:
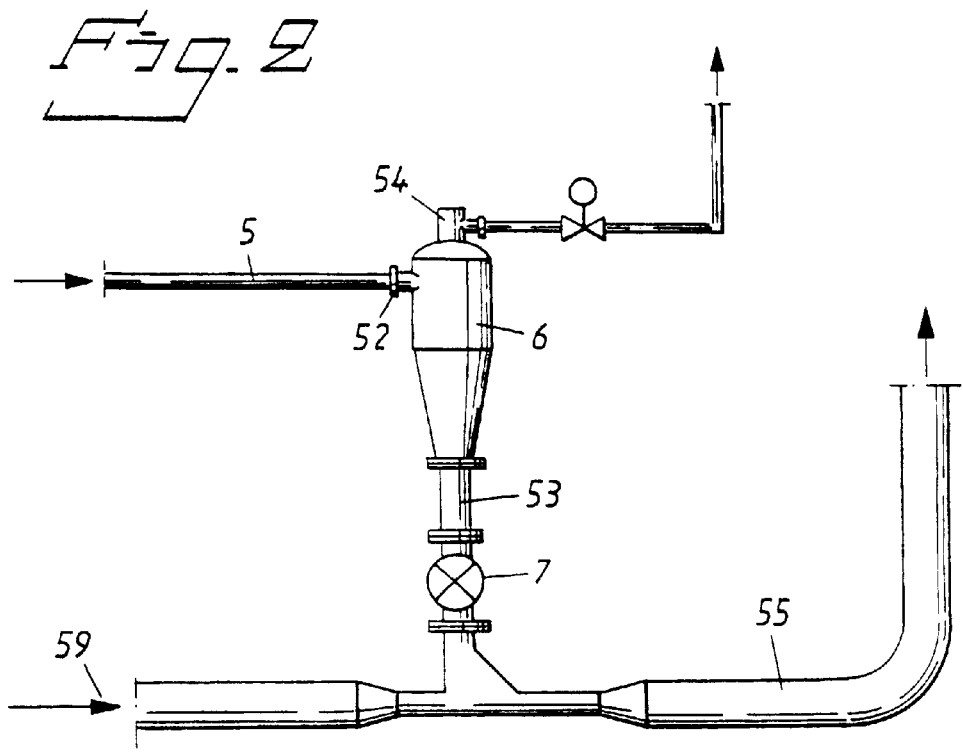
FIG. 2 is a top, elevational, partial view of a portion of the plant shown in FIG. 1a in an enlarged scale and in an alternative embodiment.
Figure 3:
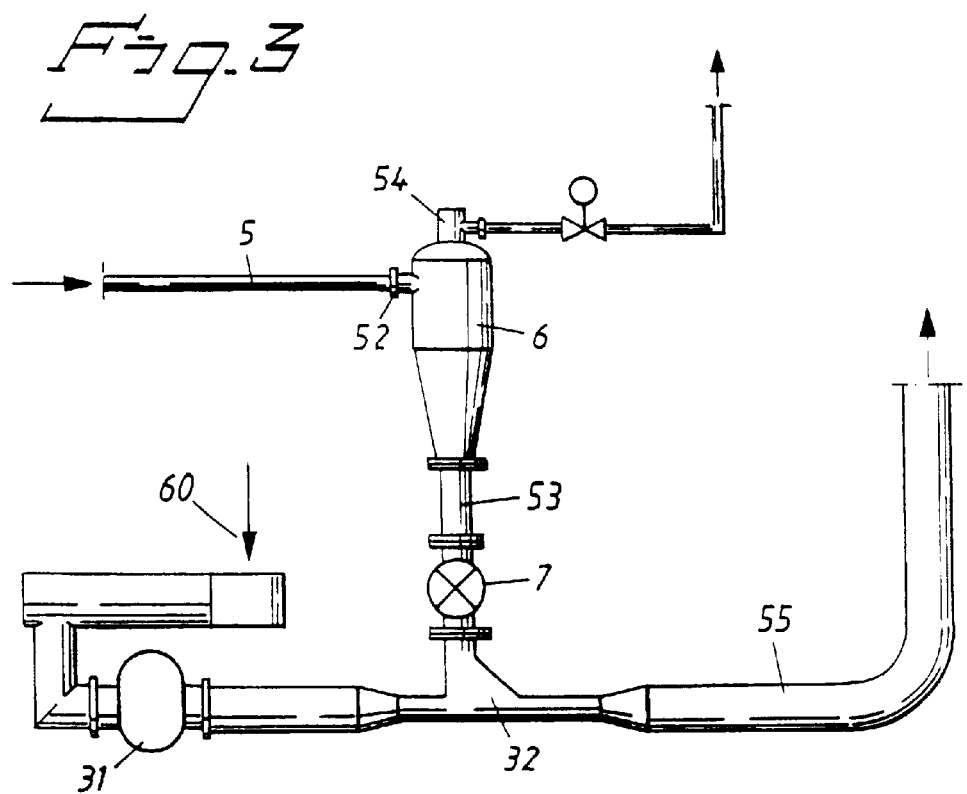
FIG. 3 is a top, elevational, partial view of the same part of the plant shown in FIG. 2 with yet another embodiment shown therein.

In an alternative embodiment 2, which is shown in FIG. 2, conveyance/drying line 55 is connected directly to sluice valve 7 so that hot air is supplied directly to the drier line at 59. In an alternative embodiment 3, which is shown in FIG. 3, the fiber is transported to the drier stage by means of compressor 31 which is supplied with conveyance air at 60 and feed injector 32.

In drier stage $C_1$, the drying air is heated as indicated by arrows 61 in air/hot-water coil 18 and in air/steam coils, 19 and 20, and also in mixing chamber 21 used for flue gas obtained from energy subplant D. The suspension of steam, air and volatile organic substances (VOC and formaldehyde) that arrives at scrubber 11 from preheater 3 is washed free of solid particles in scrubber 11 using condensate pumped from condensate tank 26 by means of pump 28. Parts of released emissions from the wood are condensed and leave scrubber 11 together with the scrubber water. Steam leaving scrubber 11 is used during condensation to heat the drying air in air/steam coil 20. Condensate from coil 20 leaves separator 14 where volatile organic emissions proceed by means of regulator valve 15, suction fan 22 (FIG. 1b) and duct 30 to incinerator 62 in energy subplant D.

Steam obtained from cyclone separator 6 that contains organic emissions released in connection with fiber production and sizing is washed free of solid particles in scrubber 10 using condensate from condensate tank 26. Parts of the aforesaid emissions are condensed and leave scrubber 10 together with the scrubber water. The washed steam from scrubber 10 is sent to heating coil 19 where it is used to heat drying air 61. In heating coil 19 the steam is condensed, and the condensate is sent to separator 16 from which volatile non-condensable emissions are sent to incinerator 62 for incineration by means of regulator valve 17, suction fan 22 and duct 30.

The condensate in condensate tank 26 is transported by pump 27 to heat the drying air in heating coil 18. The condensate leaves coil 18 at a temperature of about 40° C. by means of separator 12 where the remaining emissions of volatile organic gases are sent to incinerator 62 by means of valve 13, suction fan 22 and duct 30.

Condensate from separator 12 is sent to tank 23, which contains a decanter insert. Condensate consisting of emission remnants (terpenes) released from the wood substance is decanted and transported by pump 24 and pipe 29 to incinerator 22 where it is used to moisten solid fuel 63 and grindings 64, which are also transported here.

The level in condensate tank 23 is regulated by means of pump 25. Water that proceeds by means of pump 25 is a) used if so desired to heat drying air, as indicated by arrows 65, in drier stage $C_2$ by means of heating coil 40, or b) used in the rest of the process wherever needed, or c) sent out directly for purification. Drying air 61 and drying air 65 in drier stages $C_1$ and $C_2$ are heated to the final temperature together, if so desired, with flue gas from the energy subplant by means of mixing chambers 21 and 41, or using some other heating medium.

FIG. 4 shows an alternative embodiment of the plant, which is somewhat simplified relative to the previously described alternative embodiments. Here, fiber-production part A is the same as in the embodiments previously described. In steam separator part B, on the other hand, the emissions released in preheater 3 are sent together with steam and air through line 70 to heat exchanger 73 and condensate tank 76 in order to separate condensable organic substances and volatile waste gases and recover heat from the steam. Bottom outlet 53 on cyclone separator 6 is connected, by means of sluice valve 7, to injector 32 which is located in conveyance/drying line 55 that runs to the first drier stage $C_1$. Upper connection 54 on cyclone separator 6 is also connected to heat exchanger 73 in order to heat the drying air.

In drier stage $C_1$, the drying air is heated, as indicated by arrows 87, in the following manner: a) heat exchanger 75, b) mixing chamber 74 together with mixed-in drying air leaving cyclone separator 83 in drier stage $C_2$, c) heat exchanger 73 together with steam from cyclone separator 6 and preheater 3 and d) mixing chamber 72 using the necessary supplementary drying energy introduced at 85. In drier stage $C_2$, the drying air is heated in heat exchanger 78 and also by means of heating coil 84, alternatively using a heating medium supplied at 86.

An alternative to the aforesaid drying air heating arrangement can be provided by eliminating mixing chamber 74, where mixed-in drying air from drier stage $C_2$ is used. Another alternative can be provided by eliminating heat exchangers 75 and 78 which are intended for cooling condensate sent from condensate tank 76 to condensate tank 79 and replacing them with some other form of cooling.

The suspension of steam, air and volatile organic substances (VOC and formaldehyde) which arrives at heat exchanger 73 from preheater 3 and cyclone separator 6 is condensed and sent out as condensate to tank 76, where volatile organic emulsions in the gaseous state are sent to the energy subplant for incineration through 93. Parts of the emulsions mentioned above are condensed and transported together with the condensate by pump 77 to heat exchanger 75 used for drier stage $C_1$ and also to heat exchanger 78 used for drier stage $C_2$ and they transfer parts of their heat content to the drying air. Transport to cyclone separator 83 is provided by fan 82.

Condensate from heat exchanger 78 is sent at a temperature of about 40° C. to condensate tank 79, from which remaining emulsions of volatile organic gases are sent by means of 93 to the energy subplant for incineration. The level in condensate tank 79 is regulated by means of pump 80. If so desired, water from pump 80 is used, by means of 89, in the rest of the process wherever needed or is sent out directly for purification.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for the treatment of wood chips comprising preheating said wood chips in a preheater in the presence of steam thereby producing preheated wood chips and volatile organic substances from said wood chips, mechanically processing said preheated wood chips in a beater whereby wood fibers are released from said wood chips and said steam and said volatile organic substances are contained therein, feeding size to said wood fibers, separating said wood fibers from said steam and said volatile organic substances in a cyclone including an inlet, an upper outlet and a lower outlet, transporting said wood fibers, said steam, said size, and said volatile organic substances from said beater to said inlet of said cyclone through a blower line, carrying said wood fibers from said lower outlet of said cyclone through a drying conduit, controlling said removal of said wood fibers from said cyclone through a sluice valve associated with said lower outlet of said cyclone, and processing said steam and said volatile organic substances from said upper outlet of said cyclone, whereby said volatile organic substances separated in said cyclone are separated, and heat associated with said steam separated in said cyclone is recovered.

2. The method of claim 1 including separating said volatile organic substances from said steam separated in said cyclone by means of a scrubber, and recovering heat from said steam separated in said scrubber.

3. The method of claim 2 including transporting said wood fibers in said drying conduit through a steam ejector associated with said lower outlet of said cyclone, and mixing flue gas and drying air and supplying said mixture of flue gas and drying air to said steam ejector.

4. A method of claim 2 including supplying compressed air to an injector associated with said lower outlet of said cyclone for transporting said wood fiber, said steam and said volatile organic substances in said drying conduit.

5. The method of claim 2 including supplying steam to a lower portion of said preheater, whereby said steam countercurrently contacts said wood chips entering a wood chip entrance in said preheater, and said volatile organic substances and steam can exit from an outlet from said preheater, and separating said volatile organic substances from said steam in a scrubber connected to said outlet from said preheater, and recovering additional heat from said steam.

6. The method of claim 2 including separating said volatile organic substances in a gaseous state for incineration from said upper outlet from said cyclone and recovering heat from said steam.

* * * * *